3,637,869
NONIONIC BIODEGRADABLE FOAM
CONTROL AGENT
Reinhold K. Seizinger, Trenton, Mich., assignor to BASF
Wyandotte Corporation, Wyandotte, Mich.
Filed June 2, 1969, Ser. No. 829,484
Int. Cl. C07c 43/04
U.S. Cl. 260—615 B         6 Claims

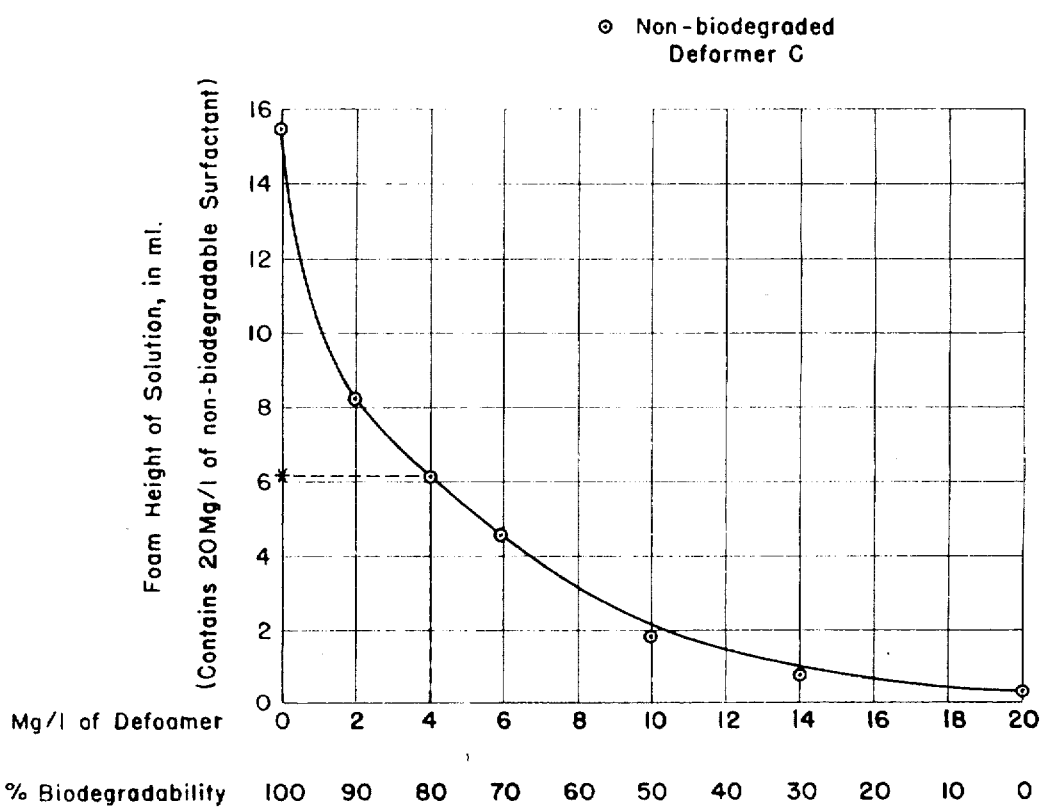
\* Foam Height produced with biodegraded Defoamer C, based on an Average of daily Observations conducted over a thirty Day Period.
INVENTOR.
R. K. Seizinger
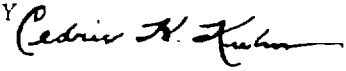
ATTORNEY United States Patent Office 3,637,869
Patented Jan. 25, 1972

ABSTRACT OF THE DISCLOSURE

Disclosed herein are nonionic biodegradable foam control agents prepared from the specific sequential reaction of (a) a polyfunctional initiator and an alkylene oxide having from ten to twenty carbon atoms, and (b) the product of (a) and mixtures of lower alkylene oxides, each having from two to four carbon atoms to yield a substantially hydrophobic final product having a molecular weight of from 1,000 to 2,000 which exhibits sufficient hydrophilic characteristics to be partially water-soluble.

The present invention concerns nonionic foam control agents. More particularly, the present invention concerns nonionic biodegradable foam control agents and methods of preparation therefor.

Nonionic foam control agents or defoamers are well known in the art and they enjoy a wide variety of use. However, the prior art foam control agents, while exhibiting good foam control properties, fail to be biodegradable, i.e., they do not reduce to water-soluble, simple organic compounds when attacked by bacterial matter such as those present in sewage filtration and water purification processes. With the recent clamor for feasible ways to avoid pollution of waterways, lack of biodegradability renders the heretofore known foam control agents quite unattractive.

It is, therefore, an object of the present invention to provide a biodegradable nonionic foam control agent. It is another object of the present invention to provide improved foam control agents having superior efficiency in controlling the foam levels produced by anionic and nonionic surfactants in typical aqueous solutions. It is yet another object of the present invention to provide a method for preparing these foam control agents. These and other objects of the invention will become apparent to those skilled in the art from a consideration of the following detailed description of the invention and specific embodiments thereof as well as the drawing which is a graph illustrating the biodegradability of the products.

In accordance with the present invention, it has now been discovered that biodegradable foam control agents are provided by sequentially reacting certain alkylene oxides with alkylene oxide adducts of polyhydric compounds to provide a substantially hydrophobic compound which exhibits sufficient hydrophilic characteristics to be slightly or partially soluble in typical aqueous solutions. These foam control agents, as will subsequently be shown, have wide utility as additives in detergent compositions, paper manufacture, latex production and the like.

With more particularity, the present invention contemplates the preparation of nonionic biodegradable foam control agents by (a) reacting higher alkylene oxides having from ten to twenty carbon atoms and/or mixtures thereof with a polyfunctional initiator to provide a hydrophobic intermediate product and, thereafter, (b) condensing the product of (a) with mixtures of lower alkylene oxides having from two to four carbon atoms to produce a final product having an average molecular weight of from 1,000 to 2,000, which is substantially hydrophobic but exhibits sufficient hydrophilic characteristics to be water-dispersible.

The polyfunctional initiators contemplated by the present invention are alkylene oxide adducts of polyhydric compounds having from two to four reactive hydrogens and preferably from three to four reactive hydrogens. These initiators are generally prepared by reacting at about 100 to 150° C. and in the presence of a catalytically effective amount of a suitable catalyst from about 1.0 mole to 1.5 moles of a lower alkylene oxide per functional group of the polyhydric compound.

Typical lower alkylene oxides are those alkylene oxides having from two to four carbon atoms, such as, ethylene oxide, propylene oxide, 1,2-butylene oxide, 2,3-butylene oxide, and mixtures thereof. Suitable polyhydric compounds include polyhydric alcohols that is, alkane polyols having from three to six carbon atoms and from two to four primary and/or secondary hydroxyl groups, preferably from three to four primary and/or secondary hydroxyl groups, such as, glycerine, 1,2,4-butane triol, 1,2,4-pentane triol, 1,2,6-hexane triol, trimethylol ethane trimethylolpropane erythritol, pentaerythritol and the like. Other suitable polyhydric compounds include amino alcohols, for example, mono-, di-, and triethanol amine; further suitable polyhydric compounds include ammonia and its derivatives as well as alkylene amines, such as, ethylene diamine and the like. Among the many suitable polyhydric compounds, the preferred one is glycerine.

Typical catalysts for carrying out the condensation reaction are oxyalkylation catalysts, such as, the hydroxides of potassium, sodium and barium; calcium oxide; calcium alcoholate; alkaline earth metals, such as, calcium and barium; sodium; sodium hydride; sodium phenate, or any other well known oxyalkylation catalyst. The preferred catalyst is potassium hydroxide. As noted above, catalytically effective amounts of the catalyst are employed. Generally, from about fourteen to sixteen weight percent of catalyst, preferably, fifteen weight percent of catalyst, based on the amount of polyhydric alcohol, is used.

The polyfunctional initiator can be used alone or in admixture with a coinitiator such as a low molecular weight diol. The low molecular weight diols contemplated herein are those having from two or four carbon atoms and they include ethylene glycol, propylene glycol, 1,2-butylene glycol, 1,3-butylene glycol, 1,4-butylene glycol, 2,3-butylene glycol and mixtures thereof. Preferably, from about 0.1 to 0.2 mole of diol per mole of the polyfunctional initiator is used with the co-initiator.

The higher alkylene oxides that are reacted with the above-described polyfunctional initiator in the first step of the present method generally comprise those alkylene oxides having from ten to twenty carbon atoms, preferably from eleven to fourteen carbon atoms, which are preferably unsubstituted, linear and ethylenically saturated. Furthermore, it is preferred, but not essential, that these compounds be α-olefin oxides, i.e., 1,2 - alkylene oxides. Typical examples of 1,2-alkylene oxides include, for example, decylene oxide, unedecylene oxide, dodecylene oxide, tridecylene oxide, tetradecylene oxide, pentadecylene oxide, hexadecylene oxide, heptadecylene oxide, octadecylene, nondecylene oxide, eicosylene oxide and mixtures thereof.

Typical examples of other higher alkylene oxides suitable for use in the practice of the present invention include, for example, 2,3 - decylene oxide, 3,4 - decylene oxide, 4,5-decylene oxide, 5,6-decylene oxide, 2,3-unedecylene oxide, 3,4-undecylene oxide, 4,5-undecylene oxide, 5,6-undecylene oxide, 2,3-dodecylene oxide, 3,4-dodecylene oxide and the like, as well as mixtures thereof. Indeed, any alkylene oxide having from ten to twenty carbon atoms is suitable for the present invention. It is preferred, however, to employ the 1,2-alkylene oxides.

In carrying out the first step of the present method, the alkylene oxide is added to the polyfunctional initiator in a ratio of 1.0 to 1.5 moles of alkylene oxide per reactive functional group of the polyfunctional initiator and at a temperature ranging from 110 to 150° C., preferably from 125 to 135° C. Generally, the addition is completed after about one to five hours, usually after about three hours.

It is noteworthy that this intermediate polyol product is essentially hydrophobic because of the high molecular weight alkylene oxide which is condensed with the initiator which, depending on its selection, is either hydrophobic or hydrophilic.

After the intermediate is prepared, the lower alkylene oxides are added to and reacted with the intermediate. At this point, the criticality of this sequential addition must be mentioned. The lower alkylene oxides, as will hereinafter be shown, impart hydrophilic characteristics or water solubility to the present foam control agents, and the higher alkylene oxides promote foam control and biodegradability. If the order of addition were reversed, i.e., if the lower alkylene oxides were reacted with the initiator and thereafter the higher alkylene oxides were reacted, then the water solubility of the product would be impaired. In other words, if the end grouping of the molecular structure of the present compounds were comprised of the hydrophobic higher alkylene oxides, then the hydrophilic moiety of the molecule would be blocked and water solubility impaired. The same result as by a reverse addition would occur if a copolymerization were attempted because of the greater reactivity of the lower alkylene oxides as compared to the higher alkylene oxides. Hence, it is critical that the alkylene oxides be added sequentially in the order indicated.

The lower alkylene oxides contemplated herein for reaction with the intermediate are those unsubstituted, ethylenically saturated alkylene oxides having from two to four carbon atoms. These alkylene oxides include, for example, ethylene oxide, propylene oxide, 1,2-butylene oxide, and 2,3-butylene oxide. It is essential to the present invention that these lower alkylene oxides be reacted with and added to the intermediate as mixtures of ethylene oxide and at least one other alkylene oxide having from three to four carbon atoms, such as:

(a) a mixture of propylene oxide and ethylene oxide;
(b) a mixture of 1,2-butylene oxide and ethylene oxide;
(c) a mixture of 2,3-butylene oxide and ethylene oxide; or
(d) a mixture of (a), (b), and (c).

Additionally, it is critical that a proper mole ratio of propylene oxide and/or butylene oxide to ethylene oxide be maintained to prevent degradation of water dispersability which in turn directly affects foam control because of the hydrophilicity of the ethylene oxide. The mole ratio of propylene oxide and/or butylene oxide to ethylene oxide can vary from 1.5:1 to 3.5:1, preferably from 2.0:1 to 3.0:1. Sufficient amounts of these mixed lower alkylene oxides are condensed with the intermediate to ensure a final product having a molecular weight of from about 1,000 to 2,000.

The addition of the mixed lower alkylene oxides is carried out within the hereinbefore defined temperature range. Thereafter, the reaction is allowed to proceed at the same temperature for about one to two hours to ensure complete reaction between the intermediate and the mixed lower alkylene oxides. During the addition of the mixed lower alkylene oxides to the intermediate, the internal pressure generated by the addition may rise to about 60 to 80 p.s.i.g., but generally remains at about 40 to 60 p.s.i.g.

The final product can be separated from any residual catalyst by conventional techniques such as by means of an adsorbent or by neutralization with an acid and filtration of the resulting salt. Any residual volatiles can be removed by a stripping step carried out at a low pressure of around 10 mm. Hg and at elevated temperatures of about 120 to 130° C.

The final products are slightly water-soluble liquids having a light amber color. They are easily dispersed in aqueous media when introduced in effective concentrations ranging from 0.1 to 1.0% by weight and they register a pH ranging from six to eight in 1% aqueous suspensions.

The following examples, which are not to be construed as being unduly limitative of the present invention, set forth specific embodiments and typical uses thereof.

Examples I–III illustrate the preparation of defoamers in accordance with the present invention. In Examples IV–IX, the defoamers of Examples I, II, and III were referred to as A, B, and C, respectively. Unless otherwise indicated, all percentages are weight percentages.

EXAMPLE I

One mole (335 g.) of a polyfunctional initiator (which is described below in detail) was charged into a high pressure reaction vessel equipped with a heater, thermometer, mechanical agitator, evacuation and cooling assemblies. Thereafter, 794 g. (3.1 moles) of a mixture of high molecular weight alkylene oxides was added to the vessel while stirring. The mixture of alkylene oxide consisted of the following:

| Ingredient: | Weight percent of mixture |
| --- | --- |
| Tetradecylene oxide | 33⅓ |
| Hexadecylene oxide | 33⅓ |
| Octadecylene oxide | 33⅓ |

This mixture had an average oxirane content of 6.25% and therefore a molecular weight of 256.

The alkylene oxide-initiator mixture was heated for about three hours at about 125 to 135° C. Thereafter, a 596 g. mixture of lower alkylene oxides consisting of 464 g. (8 moles) of propylene oxide and 132 g. (3 moles) of ethylene oxide was added to the vessel, with stirring, at a rate of about 300 to 350 g./hr. The reaction proceeded for about two hours after the addition was completed and at the same temperatures of the first step.

The resulting product had the residual catalyst removed by the addition of an adsorbent followed by filtration. Finally, residual volatiles were removed by evacuating the vessel to about 10 mm. Hg and heating the product to 120–130° C. for about one hour.

The final product was an amber liquid which was easily dispersed in aqueous solutions in an effective concentration of up to 1.0%.

The final product had a molecular weight of 1,342 as calculated from a found hydroxyl number of 125 according to the formula:

$$\text{Molecular weight} = \frac{56.1 \times 1000 \times \text{number of hydroxyl groups}}{\text{hydroxyl number}}$$

The hydroxyl number of the defoamer was calculated as described by ASTM-D1638.

The polyfunctional initiator used herein was prepared as follows:

One mole (92 g.) of glycerine was charged into a clean, dry pressure vessel equipped for high pressure oxyalkylation. Thereafter 15% by weight of flaked 90% potassium hydroxide (14.8 g.) was added to the glycerine and the mixture was heated at 115° C. for a period of about one to two hours. Thereafter, a vacuum was applied to the mixture to strip off any water. After the vacuum was relieved and the vessel had been pressurized with nitrogen to 15 p.s.i.g., four moles (236 g.) of propylene oxide was charged, under pressure, into the vessel and reacted with the material contained therein at 115° C. for about one to two hours. After cooling, 0.15 mole of propylene glycol was mixed into the liquid reaction product.

EXAMPLE II

Following the same procedure of Example I, 0.6 mole of the same initiator was reacted with 1.8 mole (350 g.) of dodecylene oxide and thereafter with a mixture of lower alkylene oxide corresponding to that used in Example I.

The resulting product was an amber liquid with a calculated molecular weight of 1,540 as determined from a found hydroxyl number of 109.

EXAMPLE III

The procedure of Example I was followed, however, the higher molecular weight alkylene oxides consisted of a commercial mixture of $C_{11}$ to $C_{14}$ 1,2-alkylene oxides having an average molecular weight of about 210 (7–8% oxirane content). Four moles (840 g.) of this mixture was utilized. The resulting product was an amber liquid having a calculated average molecular weight of 1,335 from a found hydroxyl number of from 126 to 128.

EXAMPLE IV

The foam control agents A, B, and C were tested for foam control efficiency in the presence of an anionic surfactant.

A 200 ml. sample of a test or control solution was put into graduated cylinder and the cylinder was emplaced in a 3,000 ml. stainless steel beaker equipped with a suitable heater for maintaining a constant temperature of 60± 2° C. A gas dispersion tube centrally disposed in the graduated cylinder was adapted to deliver calibrated quantities, 0.2 standard cubic feet/hr., of nitrogen to foam the test solution by bubbling the gas through the test solution. By observing the height of the foam column produced thereby over a period of time as well as the decay of that foam column over a period of time, the over-all effect of the foam control agents in suppressing foam heights as well as in decaying established foam columns was ascertained.

In establishing the effectiveness of the present foam control agents, the control test solution employed a high foaming composition which was the ammonium salt of a sulfate ester of alkylphenoxypoly(ethylene-oxy)ethanol. This compound was used in a 0.1% concentration in tap water of 150 p.p.m. hardness.

A series of runs were conducted wherein the foam control agents were added dropwise to 200 ml. of the test solution. Based on an average drop weight of 0.02 g./drop, 100 p.p.m. of the foam control agent were present in the test solution per drop added based on an average of 1 drop equaling 100 p.p.m.

The results of the tests to determine the effect of the defoamers on a growing foam column are set forth below in Table 1.

The above foams after they reached their maximum height were then allowed to decay. The results of the decay observations are set forth below in Table 2.

TABLE 2.—FOAM HEIGHT AFTER ELAPSED TIME, IN ML.

| Elapsed time, in sec | 180 | 300 | 420 | 720 |
|---|---|---|---|---|
| I. Run 1: | | | | |
| (a) 0.1% test solution | 1,980 | 1,960 | 1,960 | 1,960 |
| (b) Test solution plus 2 drops A | 1,950 | 1,920 | 1,890 | 1,820 |
| (c) Test solution plus 3 drops A | 1,620 | 1,500 | 1,420 | 1,200 |
| (d) Test solution plus 5 drops A | 1,480 | 1,360 | 1,240 | 1,000 |
| II. Run 2: | | | | |
| (a) 0.1% Test solution | 1,970 | 1,960 | 1,960 | 1,950 |
| (b) Test solution plus 2 drops B | 1,720 | 1,660 | 1,610 | 1,500 |
| (c) Test solution plus 3 drops B | 1,680 | 1,610 | 1,540 | 1,410 |
| (d) Test solution plus 5 drops B | 1,530 | 1,420 | 1,360 | 1,170 |
| III. Run 3: | | | | |
| (a) 0.1% test solution | 1,970 | 1,960 | 1,955 | 1,950 |
| (b) Test solution plus 2 drops C | 1,900 | 1,840 | 1,740 | 1,650 |
| (c) Test solution plus 3 drops C | 1,770 | 1,680 | 1,620 | 1,420 |

From the above table, it can be seen that the present defoamers are very effective in promoting foam decay in established foam columns.

EXAMPLE V

Using a dynamic foam height test procedure such as described in U.S. Pat. No. 3,250,719, Defoamer C was tested for foam control in the presence of high foaming nonionic surfactants.

The effect of the presence of the defoamer in the dynamic foam height test is shown below in Table 3. In all instances the time elapsed was ten minutes and the flow rate was 200 ml./min.

TABLE 3

Solution: Foam height, in mm.
- (I) Run 1:
  - (a) Surfactant 1[1] _____ 440
  - (b) Surfactant+1% C _____ 350
  - (c) Surfactant+2% C _____ 230
  - (d) Surfactant+3% C _____ 225
- (II) Run 2:
  - (a) Surfactant 2[2] _____ 535
  - (b) Surfactant+1.25% C _____ 500
  - (c) Surfactant+2.5% C _____ 400
  - (d) Surfactant+5.0% C _____ 330
- (III) Run 3:
  - (a) Surfactant 3[3] _____ 600
  - (b) Surfactant+5% C _____ 500
  - (c) Surfactant+10% C _____ 460
- (IV) Run 4:
  - (a) Surfactant 4[4] _____ 360
  - (b) Surfactant+5% C _____ 320
  - (c) Surfactant+7.5% C _____ 170
  - (d) Surfactant+10% C _____ 50

[1] An ethoxylated polyol mixture of $C_{16}$ to $C_{18}$ alcohols.
[2] An ethoxylated and propoxylated adduct of a hydrophobic polyol.
[3] An ethoxylated and propoxylated adduct of a mixture of $C_{10}$ to $C_{12}$ alcohols.
[4] A nonylphenoxypoly(ethyleneoxy) ethanol.

As can be seen from Table 3, the defoamer produces excellent foam suppression in the presence of high foaming nonionic surfactants.

TABLE 1.—FOAM RISE AFTER ELAPSED TIME, IN ML.

| Time elapsed, in sec | 180 | 300 | 420 | 640 | 655 | 685 | 695 | 72 |
|---|---|---|---|---|---|---|---|---|
| I. Run 1: | | | | | | | | |
| (a) 0.1% test solution | 760 | 1,100 | 1,420 | | 2,000 | | | |
| (b) Test solution plus 2 drops A | 700 | 1,020 | 1,380 | | 2,000 | | | |
| (c) Test solution plus 3 drops A | 780 | 1,000 | 1,300 | | | | | [1]1,780 |
| (d) Test solution plus 5 drops A | 650 | 900 | 1,160 | | | | | [1]1,640 |
| II. Run 2: | | | | | | | | |
| (a) 0.1% test solution | 700 | 1,010 | 1,330 | | | 2,000 | | |
| (b) Test solution plus 2 drops B | 650 | 930 | 1,240 | | | | | [1]1,820 |
| (c) Test solution plus 3 drops B | 640 | 940 | 1,210 | | | | | [1]1,780 |
| (d) Test solution plus 5 drops B | 630 | 920 | 1,170 | | | | | [1]1,680 |
| III. Run 3: | | | | | | | | |
| (a) 0.1% test solution | 740 | 1,080 | 1,440 | 2,000 | | | | |
| (b) Test solution plus 2 drops C | 720 | 1,000 | 1,340 | | | | 2,000 | |
| (c) Test solution plus 3 drops C | 670 | 980 | 1,240 | | | | | [1]1,910 |

[1] In the presence of the foam control additives a near steady state of collapse at the top surface of the growing foam column was observed and therefore the maximum height of 2,000 ml. was not reached even at the maximum test time of 720 seconds.

EXAMPLE VI

The present defoamers were then tested for capabilities in suppressing the foam height of black liquors produced in kraft pulp processing. The foam suppression determinations were made by agitating a 300 ml. test solution in a Waring blendor for thirty seconds and thereafter pouring the agitated solution into a 1000 ml. graduated cylinder. After three minutes, the residual foam height in the graduate was visually observed and recorded.

In each test, the control solution comprised a mixture of 285 ml. of tap water and 15 ml. of black liquor. In the tests containing a defoamer, the defoamer was added dropwise (0.2 g./drop=100 p.p.m.) to the test solution prior to agitation. The results of the foam control test are set forth below in Table 4.

TABLE 4

| | Concentration of defoamer in p.p.m. | Residual foam height in ml. |
|---|---|---|
| I. Run 1: | | |
| Solution: | | |
| (a) Control | 0 | 290 |
| (b) Control plus C | 700 | 30 |
| (c) Control plus C | 1,400 | 25 |
| II. Run 2: | | |
| Solution: | | |
| (a) Control | 0 | 260 |
| (b) Control plus C | 700 | 50 |
| (c) Control plus A | 700 | 80 |
| (d) Control plus D.O.K.[1] | 700 | 240 |
| (e) Control plus 1⅔ C plus ⅓ D.O.K.] | 700 | 40 |
| (f) Control plus 1⅔ A plus ⅓ D.O.K.] | 700 | 260 |

[1] Deodorized kerosene which is a universally employed defoaming agent for black liquors.

It can be seen from the above that the present defoamers are highly superior to kerosene as a black liquor foam depressant.

EXAMPLE VII

As noted above, the present defoamers exhibit excellent defoaming properties in detergent compositions. The following example illustrates the point by showing the effects of the present defoamers when incorporated into detergent compositions.

A typical built heavy duty laundry detergent was charged into a horizontally agitated washing machine. Under normal agitation, a foam column, with water at 51.7° C., of greater than eight inches developed and the machine overflowed.

Under similar test conditions, when the detergent was combined with 3% by weight of defoamer C, a foam column of only 1.5 inches developed.

The typical built heavy duty detergent had the following composition by weight:

Ingredient: Weight percent of composition
  Surfactant[1] _____ 10
  Sodium carboxymethyl cellulose _____ 2
  Sodium tripolyphosphate (granular) _____ 45
  Sodium metasilicate _____ 10
  Light soda ash _____ 23
  Sodium sulfate _____ 10

[1] A nonionic surfactant comprising an ethoxylated and propoxylated mixture of polyhydric alcohols having from 12 to 15 carbon atoms.

EXAMPLE VIII

Based on the proposition that a biodegraded defoamer could not effectively suppress the foaming capabilities of an aqueous surfactant solution, the present defoamers were tested for biodegradability.

In applying this principle, a series of control solutions was prepared and foam height determinations were made in accordance with standard procedures (see Bacon, JAOCS, 43, No. 1, January 1966) and a calibration curve, as shown in the drawing, was thereby prepared. The control solutions were prepared by adding a concentration of 20 mg./l. of a surfactant to stock solutions which were based on settled blank effluent from an activated sludge bed. The stock solutions themselves were prepared by adding predetermined concentrations, ranging from 0 mg./l. to 20 mg./l., of non-bacteriologically treated defoamer to the blank effluent. The foam heights observed from testing these control solutions (which are shown below in Table 5) were then plotted on a graph and the calibration curve was thereby derived. In relation to biodegradability, the points on the curve had the following meaning:

(a) The foam height produced by a control solution containing 0 mg./l. of defoamer represented the foam height that would be produced from a similar solution containing a concentration of 20 mg./l. of a defoamer that was 100% biodegraded.

(b) The foam height produced by a control solution containing 10 mg./l. of defoamer represented the foam height that would be produced from a similar solution containing a concentration of 20 mg./l. of a defoamer that was 50% biodegraded.

(c) The foam height produced by a control solution containing 20 mg./l. of defoamer represented the foam height that would be produced from a similar solution containing a concentration of 20 mg./l. of a defoamer that was not biodegraded. The remainder of the test solutions represented proportional increments of biodegradability.

After the curve had been prepared and its relationship to biodegradability had been established, a new series of tests was conducted utilizing bacteriologically treated defoamer. In carrying out these tests, samples of a defoamer were introduced into an activated sludge bed and the settled effluent containing the residue of the defoamer was drawn off. Aliquot portions of the effluent were measured out such that a theoretical concentration of 20 mg./l. of defoamer, assuming no biodegradation, was present in the effluent. A 20 mg./l. concentration of surfactant was then added to the effluent and foam height determinations were made. The observed foam height was then correlated to the calibration curve and the biodegradability of the defoamer was thereby ascertained.

Test solutions employing bacteriologically treated defoamer C produced an average foam height of 6.1 ml., based on daily observations over a 30 day period, when tested in accordance with the above-outlined procedure. With reference to the drawing, it is seen that a foam height of 6.1 ml. is produced by a test solution containing a 20 mg./l. concentration of an 80% biodegraded defoamer. Thus, defoamer C was determined to be 80% biodegradable.

In conducting these tests an ethoxylated and propoxylated hydrophobic polyol based surfactant, which is non-biodegradable, was employed.

TABLE 5.—FOAM HEIGHTS PRODUCED BY CONTROL SOLUTIONS

Concentration of defoamer in
control solution [1], in mg./l.:   Foam heights [2], in ml.
  0 _____ 15.5
  2 _____ 8.2
  4 _____ 6.1
  6 _____ 4.6
  10 _____ 2.5
  14 _____ 0.9
  20 _____ 0.3

[1] Blank effluent containing concentration of 20 mg./l. of surfactant.
[2] Average of four samples.

EXAMPLE IX

This example illustrates the effectiveness of the present defoamers in suppressing the foam generated by various urethane latex formulations.

To a 250 ml. test tube equipped with a Hamilton Beach stirrer was added 100 ml. of a urethane latex (15% solids). After stirring for five minutes at a variac setting of 40, the foam height of the latex was measured and recorded. Thereafter, the same procedure was repeated except that a selected quantity of a defoamer was added to the latex. The results of tests conducted in accordance with this procedure are set forth below in Table 6.

In the table, latex 1 refers to the latex described in Example VII of U.S. Patent No. 3,294,724. Latices 2 and 3 refer to latices as described in Example 14 of U.S. Patent No. 3,401,133, and latex 4 refers to the latex as described in Example 8 of U.S. Patent No. 3,410,817 except that in the preparation of each latex the nonionic surface active agent used was one prepared by reacting a polyethylene glycol with an aromatic diepoxide.

In all the tests conducted in accordance with the above-described procedure, the defoamer designated herein as defoamer C was utilized.

TABLE 6.—EFFECT OF DEFOAMER IN LATEX

| Latex: | Parts defoamer/ 100 parts solids | Foam height, in inches |
|---|---|---|
| 1 | 0 | 4.25 |
| 1 | 0.5 | 2.00 |
| 1 | 1.0 | 1.00 |
| 1 | 2.0 | 0.50 |
| 1 | 3.0 | 0.25 |
| 2 | 0 | 4.00 |
| 2 | 1 | 0.25 |
| 3 | 0 | 3.00 |
| 3 | 1 | 0.25 |
| 4 | 0 | 2.50 |
| 4 | 1 | 1.00 |

It can be seen from the table that defoamer C imparts excellent foam suppression to urethane latices even when present in rather minute concentrations.

What is claimed is:

1. A nonionic biodegradable foam control agent having an average molecular weight of from about 1000 to 2000 comprising the reaction product of:
    (a) a hydrophobic intermediate prepared by reacting at a temperature of from about 110° to 150° C. (1) a polyfunctional initiator which is the reaction product of a polyhydric compound having from two to four reactive hydrogens and selected from the group consisting of alkane polyols having from three to six carbon atoms and from two to four primary or secondary hydroxyl groups, and a lower alkylene oxide having from 2 to 4 carbon atoms, the lower alkylene oxide being employed in an amount ranging from about 1.0 mole to 1.5 moles thereof per functional group of the polyhydric compound, and (2) an alkylene oxide having from ten to twenty carbon atoms, the alkylene oxide being employed in an amount ranging from about 1.0 to 1.5 moles thereof per reactive functional group of the polyfunctional initiator, and
    (b) a mixture of ethylene oxide and alkylene oxide having from three to four carbon atoms wherein the mole ratio of alkylene oxide having from three to four carbon atoms to ethylene oxide ranges from 1.5:1 to 3.5:1,
wherein (a) and (b) are reacted together at a temperature ranging from about 110° to 150° C., and in the presence of an oxyalkylation catalyst.

2. The foam control agent of claim 1 wherein said polyfunctional initiator is the alkylene oxide adduct of an alkane polyol selected from the group consisting of glycerine, 1,2,4-butane triol, 1,2,4-pentane triol, 1,2,6-hexane triol, trimethylol ethane, trimethylolpropane, erythritol and pentaerythritol.

3. The foam control agent of claim 2 wherein said polyfunctional initiator is the propylene oxide adduct of glycerine.

4. The foam control agent of claim 2 wherein said polyfunctional initiator has admixed therewith from about 0.10 to 0.20 mole of a diol per mole of said alkylene oxide adduct of said polyhydric compound, said diol being selected from the group consisting of ethylene glycol, propylene glycol, 1,2-butylene glycol, 1,3-butylene glycol, 1,4-butylene glycol, 2,3-butylene glycol and mixtures thereof.

5. The foam control agent of claim 1 wherein said mixture is selected from the group consisting of:
    (a) ethylene oxide and propylene oxide,
    (b) ethylene oxide and 1,2-butylene oxide,
    (c) ethylene oxide and 2,3-butylene oxide, and
    (d) a mixture of (a), (b), and (c).

6. The foam control agent of claim 5 wherein the mole ratio of said alkylene oxide to said ethylene oxide is from 2.0:1 to 3.0:1.

References Cited

UNITED STATES PATENTS

| 2,944,979 | 7/1960 | De Groote et al. | 260—615 B X |
| 2,948,757 | 8/1960 | Pruitt et al. | 260—615 B |
| 3,022,335 | 2/1962 | Lundsted | 260—615 B X |
| 3,030,426 | 4/1962 | Moseley et al. | 260—615 B |
| 3,057,891 | 10/1962 | De Groote | 260—615 B |
| 3,101,374 | 8/1963 | Patton | 260—615 B |
| 3,169,934 | 2/1965 | Dennett et al. | 260—615 X |
| 3,240,819 | 3/1966 | Gaertner et al. | 260—615 B |
| 3,317,508 | 5/1967 | Winquist et al. | 260—615 B X |
| 3,406,208 | 10/1968 | Blaser et al. | 260—615 B |
| 3,427,248 | 2/1969 | Lamberti et al. | 260—615 B X |

HOWARD T. MARS, Primary Examiner

U.S. Cl. X.R.

162—45, 158; 252—89, 321, 358; 260—29.2